United States Patent [19]

Rebikoff

[11] 4,295,721

[45] Oct. 20, 1981

[54] HIGH PRESSURE AND HIGH SPEED OPTICAL ENCLOSURE SYSTEM

[76] Inventor: Dimitri Rebikoff, 3060 SE 4th Ave., Ft. Lauderdale, Fla. 33315

[21] Appl. No.: 143,140

[22] Filed: Apr. 23, 1980

[51] Int. Cl.³ .............................................. G03B 17/08
[52] U.S. Cl. ..................................................... 354/64
[58] Field of Search ................................. 354/64, 288

[56] References Cited

U.S. PATENT DOCUMENTS

| | | | |
|---|---|---|---|
| 685,463 | 10/1901 | Walkins | 354/64 |
| 2,001,683 | 5/1935 | Jackman | 354/64 X |
| 2,256,133 | 9/1941 | Barnes | 354/64 |
| 3,001,462 | 9/1961 | De Wouters D'Oplinter | 354/64 X |
| 3,019,715 | 2/1962 | Arnold et al. | 354/64 |
| 3,788,730 | 1/1974 | Greenleaf | 354/64 X |

FOREIGN PATENT DOCUMENTS

| | | | |
|---|---|---|---|
| 1130523 | 10/1956 | France | 354/64 |
| 1547693 | 10/1968 | France | 354/64 |

*Primary Examiner*—Donald A. Griffin
*Attorney, Agent, or Firm*—Malin & Haley

[57] ABSTRACT

A fluid tight camera housing system for deep underwater use wherein the camera focal length is unaffected by external hydraulic pressure. The housing system comprises an external housing cylinder capped at the rear by a lipped plate or dome. The lipped portion is grooved for an O-ring seal which slips into the housing, sealing against its internal wall. The front end of the external housing cylinder is capped with a pressure resistant negative correcting lens system in a ring mount lipped and grooved for an O-ring seal. The outer optical element has an O-ring or other seal between it and the lens mount. Internally, a camera chassis and a primary focusing lens are connected to an internal cylinder, which is connected to the pressure resistant correcting lens system. The internal cylinder centers the camera on the optical axis and holds it independently of the external housing cylinder and rear plate. By mounting the camera to the internal cylinder and the internal cylinder to the pressure resistant lens mount, the distance and axial alignment (bore sighting) between the primary focusing lens and film focal plane, the distance and axial alignment (bore sighting) between the correcting lens and primary lens, and the distance and axial alignment (bore sighting) between individual correcting lens members is not affected by stress on the external structure due to hydraulic pressure.

3 Claims, 4 Drawing Figures

HIGH PRESSURE AND HIGH SPEED OPTICAL ENCLOSURE SYSTEM

BACKGROUND OF THE INVENTION

This invention relates to underwater photographic and television apparatus and more particularly to a fluid tight camera housing system for underwater use in which the camera focal length is unaffected by external hydraulic pressure.

In the past there have been various underwater photographic apparatus. By way of example is U.S. Pat. No. 3,001,462, which illustrates a fluid-tight objective for underwater photographic apparatus which has the internal camera mechanism, film focal plane and primary lens mounted integrally within the external housing components.

The instant invention mounts the critical parts independently of the external housing and rear plate, leaving focus and optical alignment unaffected by external forces.

SUMMARY OF THE INVENTION

A fluid-tight external camera housing enclosed at the rear by a lipped plate and at the front by a pressure-resistant negative correcting lens system forming a casing for a conventional camera and primary lens.

The pressure-resistant negative correcting lens system is comprised of a pressure-resistant external plano-concave optical lens and an inner plano-convex lens with the plane surface of the external lens facing outward and the plane surface of the inner lens facing inward. The inner correcting lens is held in a recession machined into a ring mount by a threaded ring. The external pressure resisting lens is held in place in a preferable cylindrical recession in the ring mount by a threaded ring. An O-ring in the inner cylinder wall recession seals the system from fluid passing between the forward lens and its mount. The lens ring mount is lipped and grooved for an O-ring on its outer surface for fitting into and sealing against the bottom wall of the housing cylinder.

Internally, on a smaller diameter lip of the ring mount one end of an internal cylinder concentric to the external cylindrical housing is connected. Extending inwardly and mounted on the other end of the internal cylinder (optical barrel) is the camera chassis and primary focusing lens. The internal cylinder precisely centers the camera along the focal axis and is the camera's only connection to any external pressure bearing parts, namely, the ring mount. The internal cylinder free floats inside the external housing cylinder and therefore the camera and primary lens connected thereto are unaffected by changes in structural dimensions caused by compression forces transmitted in the external components having different stress coefficients.

A lipped plate, which forms the rear cover, is lipped and grooved for an O-ring to be fitted into and seal against the internal wall of the external housing cylinder.

The inner lens of the correcting system, internal cylinder, camera, and primary focusing lens and their positions relative to each other, are unaffected by changes in external forces. The distances between the film focal plane, primary focusing lens and correcting lens do not vary with depth.

It is therefore the primary object of this invention to provide a liquid tight housing for a camera to be used in underwater photography which allows focus and optical alignment to be unaffected by external pressure.

In accordance with these and other objects which will be apparent hereinafter, the instant invention will now be described with particular reference to the accompanying drawings.

DESCRIPTION OF THE PREFERRED EMBODIMENT

Figure 1:
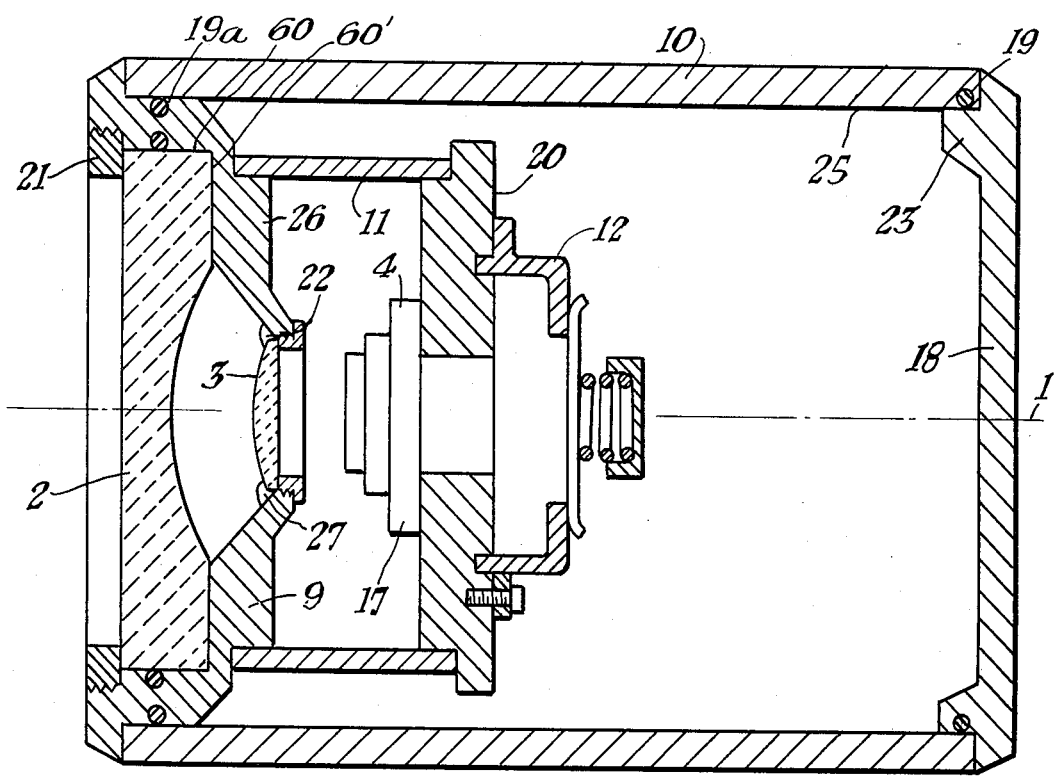
FIGS. 1, 2 and 4 are cross-sectional views of an underwater camera and associated protective housing.

Referring now to FIG. 1 showing the instant invention in cross-section with a hollow, cylindrical pressure-resistant housing 10, enclosed at the rear by a plate 18. A lip 23 on the rear plate is grooved for an O-ring seal 19 which preferably fits inside the external housing 10 sealing against the internal wall 25.

The front of the external housing 10 is covered by a pressure-resistant correcting lens system comprised of a ring mount 9, plano-concave external optical element 2, inner plano-convex optical element 3, and two O-ring (or other type) seals. The ring mount 9 has a larger diameter grooved lip 29 with an O-ring seal 19, shown inserted into the external housing 10, sealing against the internal wall 25.

Internally, the smaller diameter lip 26 is connected to the internal cylinder, tubus or spacer 11. A threaded or snap-ring 22 holds the plano-convex optical element 3 in a grooved recession 27 in the ring mount 9. An external threaded ring 21 holds the outer plano-concave optical element 2 into the cylindrical section of the ring mount 9. This ring has an internal conical step cut out to avoid vignette cutoff. The rear end of the internal cylinder, barrel, tubus or spacer 11 has mounted thereto a camera chassis 20 and focusing lens 4. The internal cylinder, barrel, tubus or spacer 11 holds the camera consisting of primary lens 4, shutter 17 and camera obscura 12 aligned with the optical axis 1.

Figure 2:
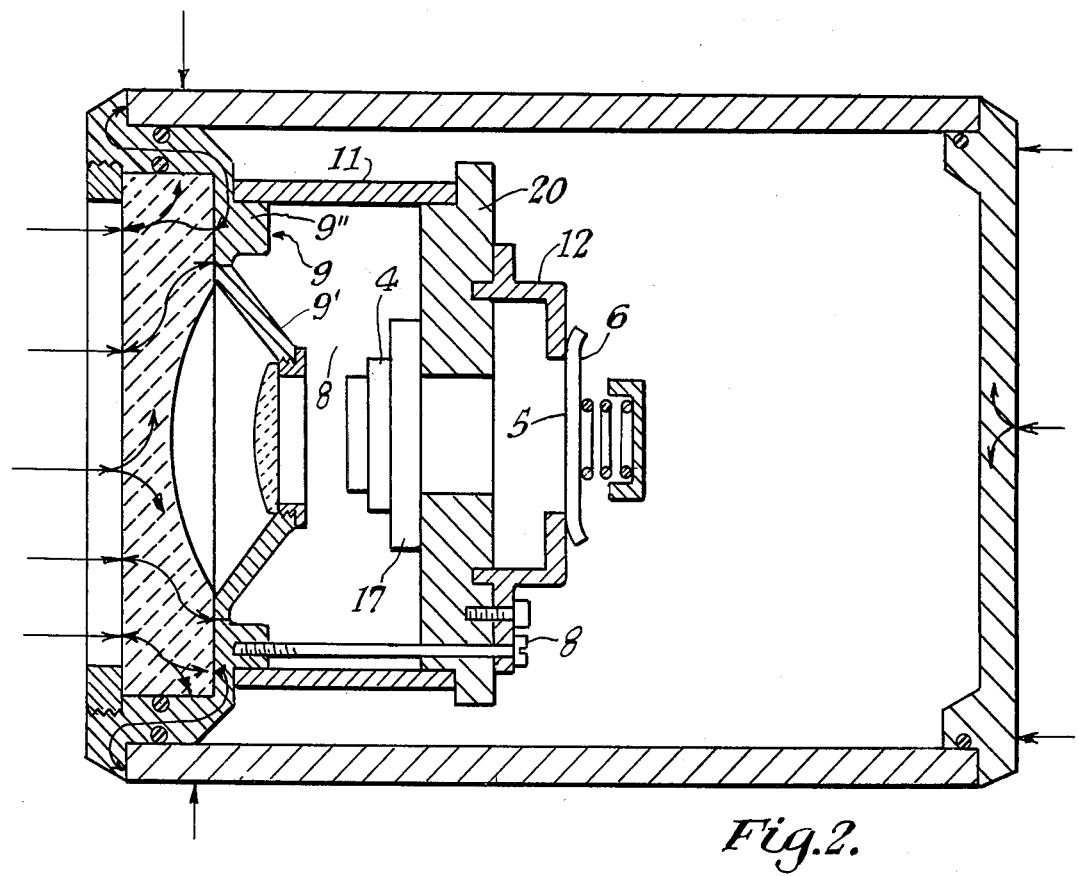

Referring now to FIG. 2 showing arrows representing the transmission of compression forces through the structure, the internal cylinder, barrel, tubus or spacer 11 remains free from such forces because the camera chassis 20 is structurally independent from all external housing components except the ring mount 9 which in the preferred embodiment is comprised of two pieces 9' and 9" which are press-fitted together. The distance between the primary focusing lens 4 and the film plane 5 remains unaffected by compression forces. The barrel 11 and the camera chassis 20 are connected to the ring mount 9 by way of three bolts 8.

The camera obscura 12 embodies the solid milled and polished film tracks, the film being held flat against the focus plane with either a spring loaded pressure plate 6 or a state of the art vacuum back 6B with a pattern of small vacuum holes connected to a vacuum pump or bellow actuated by a solenoid, moving coil or cam actuated simultaneously with the shutter 17.

In case of a television camera, the Vidicon-type tube or solid-state CCD sensor is solidly mounted as an integral unit with the camera obscura 12.

In the case of an internally, easily deformed, vidicon-type tube, a rigid dovetail or sliding optical bench mount with micrometer focusing X lateral Y and Z axis or a spring-loaded holding barrel must be provided.

Figure 3:
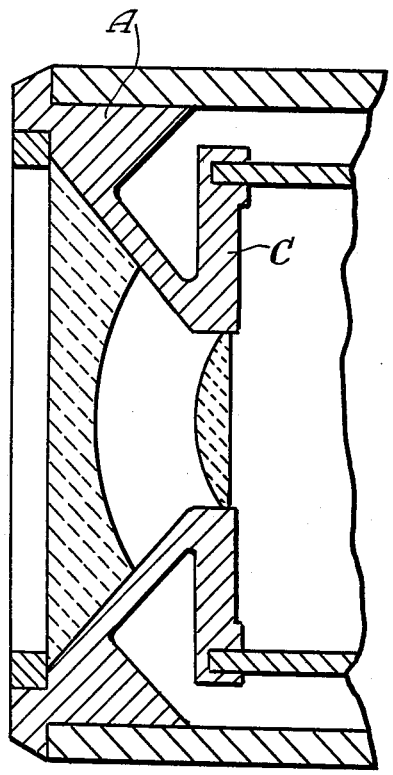
FIG. 3 is a cross-sectional view showing details of the pressure-resistant correcting lens system secured to the camera.

Referring to FIG. 3, another embodiment of the ring mount 9 is illustrated with portions A and C. Because of the shape of the ring mount 9 any transfer of distortion of portion A, because of external stress in portion A, to portion C is minimized.

Figure 4:
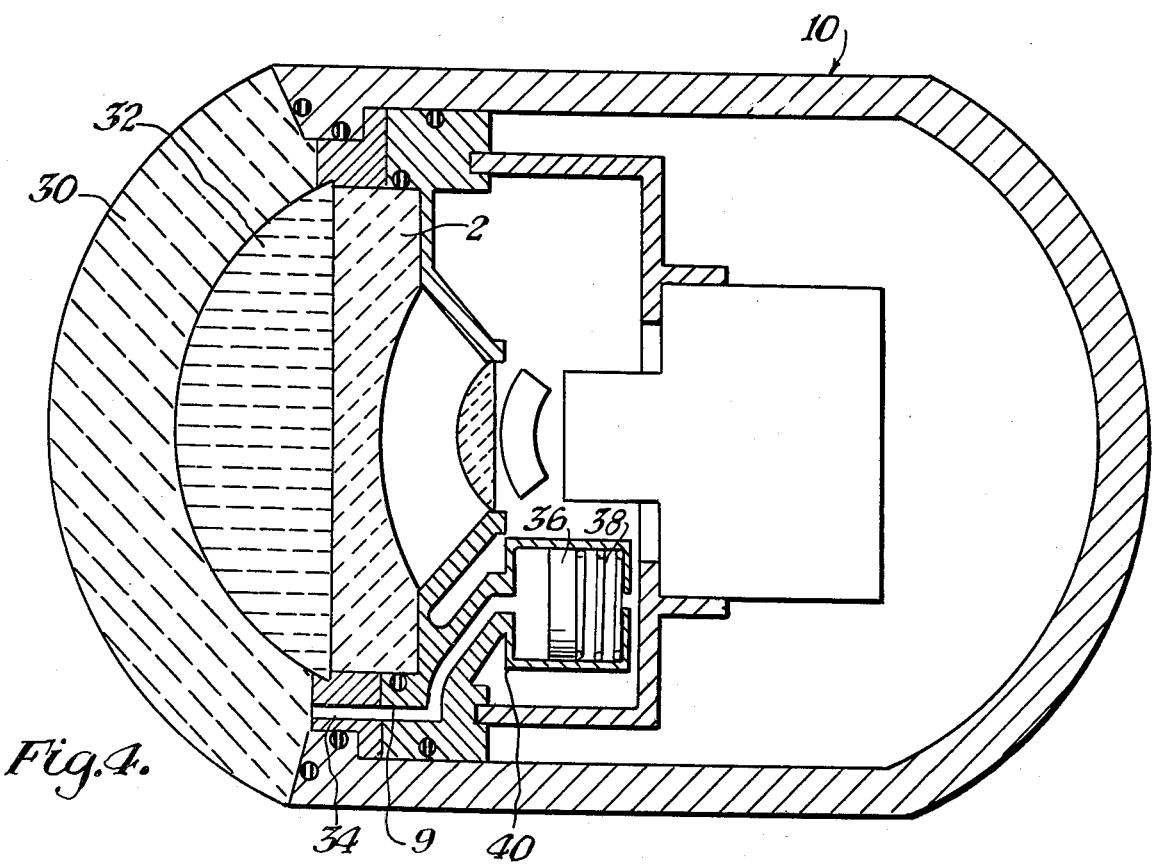

Finally, referring to FIG. 4, another embodiment illustrates the use of an immersion fluid 32, having the same refraction index as water, between the outside surface of the plano-concave external optical element 2 and a transparent front cover 30.

The immersion fluid 32 is allowed to flow through a canal 34, between the ring mount 9 and the plano-concave external optical element 2, into compensating cylinder 40.

The compensating cylinder 40 internally contains a free piston 36 and a return spring 38. The free piston 36 and return spring 38 allow for expansion and contraction of the immersion fluid 32 according to the varying pressures exerted upon the immersion fluid as the enclosure 10 is taken to different underwater depths.

All edges of the forward negative lens are rounded and polished to avoid microcrack stress raising, leading to failure under pressure.

The rate of thermal expansion of the material for member 9 or 9'' the lens mount should be as equal as possible to the rate of thermal expansion of the optical glass 2 and secondarily lens 3 in relation to member 9'.

Also both surfaces 60 and 60' including the lens and the lens mount should be polished to specular finish (mirror finish) for avoiding stress and to provide a proper seal for avoiding capillary type leaks.

Surface 60 of the lens will be finished in flat black.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A high pressure and high speed optical enclosure system for use with a film loaded camera comprising:
    an external housing cylinder;
    said external cylinder having a closed end and an open end;
    correcting lens system means for correcting the focus of the camera when said external cylinder is submerged;
    pressure resistant means for sealingly covering said open end;
    said correcting lens system means operably connected to said pressure resistant means;
    an internal cylinder;
    a primary lens, said primary lens connected to said internal cylinder;
    connecting means for connecting said internal cylinder to said pressure resistant means;
    mounting means for mounting the camera within said internal cylinder;
    said connecting means incudes a support which centers said internal cylinder and the primary lens of the camera mounted therein on its optical axis and holds said internal cylinder independently of said external cylinder and therefore maintains a constant distance between said primary lens and the film focal plane, and constant distance between said correcting lens system and said primary lens, connected to said pressure resistant means.

2. A high pressure and high speed optical enclosure system as set forth in claim 1 wherein:
    said pressure resistant means includes a forward lens and ring mount, and
    said correcting lens system includes a plano-concave optical element;
    a plano-convex optical element behind said plano-concave optical element;
    an immersion fluid having the same refraction index as water, between said forward lens and said plano-concave optical element;
    means for allowing expansion and contraction of said immersion fluid,
    said means for allowing expansion and contraction of said immersion fluid includes a canal defining a flowpath between said pressure resistant means and said plano-concave optical element, and
    a compensating cylinder internally containing a free piston and a return spring;
    said compensating cylinder connected to said canal, such that said free piston and return spring compresses and allows additional said immersion fluid to enter said compensating cylinder when external pressures increase, and said free piston and return spring expands forcing said immersion fluid from said compensating cylinder when said external pressures decrease.

3. A high pressure and high speed optical enclosure system for use with a film loaded camera comprising:
    an external housing cylinder;
    said external cylinder having a closed end and an open end;
    correcting lens system means for correcting the focus of the camera when said external cylinder is submerged;
    pressure resistant means for sealingly covering said open end;
    said correcting lens system means operably connected to said pressure resistant means;
    an internal cylinder;
    a primary lens, said primary lens connected to said internal cylinder;
    connecting means for connecting said internal cylinder to said pressure resistant means;
    mounting means for mounting the camera within said internal cylinder;
    said connecting means includes a support which centers said internal cylinder and the primary lens of the camera mounted therein on its optical axis and holds said internal cylinder independently of said external cylinder and therefore maintains a constant distance between said primary lens and the film focal plane, and constant distance between said correcting lens system and said primary lens, connected to said pressure resistant means;
    said pressure resistant means includes a forward lens and ring mount, and
    said correcting lens system includes a plano-concave optical element;
    a plano-convex optical element behind said plano-concave optical element;
    an immersion fluid having the same refraction index as water, between said forward lens and said plano-concave optical element;
    means for allowing expansion and contraction of said immersion fluid;

said means for allowing expansion and contraction of said immersion fluid includes a canal defining a flowpath between said pressure resistant means and said plano-concave optical element, and a compensating cylinder internally containing a free piston and a return spring;

said compensating cylinder connected to said canal, such that said free piston and return spring compresses and allows additional said immersion fluid to enter said compensating cylinder when external pressures increase, and said free piston and return spring expands forcing said immersion fluid from said compensating cylinder when said external pressures decrease.

* * * * *